US012715939B2

(12) United States Patent
Kolb et al.

(10) Patent No.: US 12,715,939 B2
(45) Date of Patent: Aug. 25, 2026

(54) PROCESS FOR PREPARING HYDROXY-FUNCTIONALIZED POLYBUTADIENE

(71) Applicant: Evonik Operations GmbH, Essen (DE)

(72) Inventors: Nicolai Kolb, Marl (DE); Kai-Steffen Krannig, Dortmund (DE); Jürgen Hellwig, Schwerte (DE); Matthias Bahlmann, Borken (DE); Alexander Pschantka, Coesfeld (DE); Philip Kemper, Ahaus (DE)

(73) Assignee: EVONIK OPERATIONS GMBH, Essen (DE)

( * ) Notice: Subject to any disclaimer, the term of this patent is extended or adjusted under 35 U.S.C. 154(b) by 685 days.

(21) Appl. No.: 18/247,850

(22) PCT Filed: Sep. 29, 2021

(86) PCT No.: PCT/EP2021/076805
§ 371 (c)(1),
(2) Date: Apr. 4, 2023

(87) PCT Pub. No.: WO2022/073823
PCT Pub. Date: Apr. 14, 2022

(65) Prior Publication Data

US 2023/0331874 A1 Oct. 19, 2023

(30) Foreign Application Priority Data

Oct. 7, 2020 (EP) .................................... 20200556

(51) Int. Cl.
*C08C 19/04* (2006.01)
*C08F 2/06* (2006.01)
*C08F 136/06* (2006.01)

(52) U.S. Cl.
CPC ................ *C08C 19/04* (2013.01); *C08F 2/06* (2013.01); *C08F 136/06* (2013.01)

(58) Field of Classification Search
CPC .......... C08C 19/04; C08F 2/001; C08F 36/06; C08F 36/08; C08F 236/08; C08F 136/06; C08F 136/08; C08F 236/06
See application file for complete search history.

(56) References Cited

U.S. PATENT DOCUMENTS 2,692,892 A 10/1954 Hillyer et al.
5,043,484 A * 8/1991 Knifton .................. C07C 29/36 568/807
5,063,190 A * 11/1991 Hargis .................... C08F 36/04 502/157
5,159,123 A 10/1992 Knifton et al.

FOREIGN PATENT DOCUMENTS

| | | | |
|---|---|---|---|
| CN | 1468875 | * | 1/2004 |
| CN | 1468877 | * | 1/2004 |
| CN | 1468877 | A | 1/2004 |
| EP | 0520103 | A1 | 12/1992 |
| JP | H0543609 | A | 2/1993 |
| JP | 2017528542 | A | 9/2017 |

OTHER PUBLICATIONS

Translation of CN1468875 (Year: 2004).*
Translation of CN1468877 (Year: 2004).*
International Search Report and Written Opinion for Application No. PCT/EP2021/076805 dated Jan. 24, 2022 (13 bages).
Database WPI, 2017 Clarivante Analytics, AN - 2004-662718, CN1468877A (China Nat Petroleum Corp) Jan. 1, 2004, Abstract.
Japanese Patent Office Action for Application No. 2023-519284 dated Apr. 2, 2025 (12 pages including English machine translation).

* cited by examiner

*Primary Examiner* — Robert C Boyle
(74) *Attorney, Agent, or Firm* — MICHAEL BEST & FRIEDRICH LLP (Mke)

(57) ABSTRACT

The present invention relates to a process for preparing hydroxy-functionalized polydiene, preferably polybutadiene or polyisoprene, by reacting monomer diene with hydrogen peroxide in the presence of a hydrophilic organic solvent, wherein the total amount of monomer diene used is added to the reaction in at least two parts, wherein the second part of the monomer diene is added to the reaction at a temperature of the reaction mixture that is at least +5 K different from the temperature of the reaction mixture at the addition of the first part of the monomer diene, to hydroxy-functionalized polybutadiene, having a dispersity index D below 2.7, a viscosity at 30° C. below 3200 mPa*s, an OH-number of from 50 to 90, a number average molecular weight Mn of from 1.6 to 2.5 kDa, and a weight number average molecular weight Mw of from 4.0 to 5.6 kDa. and comprising the monomer units derived from 1,3-butadiene in a specific ratio, and use of the hydroxy-functionalized poly butadiene, for the production of polyurethane-based thermo- or electro-insulation, adhesives or sealants or polyesters.

20 Claims, No Drawings

PROCESS FOR PREPARING HYDROXY-FUNCTIONALIZED POLYBUTADIENE

CROSS-REFERENCE TO RELATED APPLICATION

This patent application is the U.S. national stage entry, under 35 U.S.C. § 371, of International Application Number PCT/EP2021/076805, filed Sep. 29, 2021, which claims priority to European Patent Application No. 20200556.7, filed Oct. 7, 2020, the entire contents of each of which are hereby incorporated by reference.

The present invention relates to a process for preparing hydroxy-functionalized polydiene, preferably polybutadiene or polyisoprene, by reacting monomer diene with hydrogen peroxide in the presence of a hydrophilic organic solvent, wherein the total amount of monomer diene used is added to the reaction in at least two parts, wherein the second part of the monomer diene is added to the reaction at a temperature of the reaction mixture that is at least +5 K different from the temperature of the reaction mixture at the addition of the first part of the monomer diene, to hydroxy-functionalized polybutadiene, having a dispersity index D below 2.7, a viscosity at 30° C. below 3200 mPa*s, an OH-number of from 50 to 90, a number average molecular weight Mn of from 1.6 to 2.5 kDa, and a weight number average molecular weight Mw of from 4.0 to 5.6 kDa, and comprising the monomer units derived from 1,3-butadiene in a specific ratio, and use of the hydroxy-functionalized polybutadiene, for the production of polyurethane-based thermo- or electro-insulation, adhesives or sealants or polyesters.

The production of hydroxy-functionalized polydiene is well known in the art: GB 1401144 A describes the preparation of polybutadiene with terminal OH groups by polymerization of 1,3-butadiene in the presence of hydrogen peroxide in aqueous 2-propanol at 118° C. for 2 h.

U.S. Pat. No. 5,043,484 A describes the production of OH-terminated polybutadiene by polymerization of butadiene in the presence of aqueous $H_2O_2$ and a propylene glycol tertiary alkyl ether as solvent.

JP 07068302 B describes the preparation of OH-terminated liquid polyisoprene by polymerisation of isoprene in BuOH in the presence of $H_2O_2$ at 120° C. for 2 h under stirring.

WO2013178293 A1 discloses a process for the polymerization of a diene, which comprises the steps: reaction of the diene with hydrogen peroxide in a hydrophilic organic solvent in the presence of water to form a reaction mixture at temperatures of from 50 to 150° C. and pressures of 0-5 MPa, contacting of the reaction mixture with water, where the temperature of the water is from 20 to 80° C., preferably from 50 to 65° C., separation of unreacted gaseous diene from the reaction mixture which has been contacted with water in step b), followed by condensation, distillation and reuse of the unreacted gaseous diene, separation of the aqueous phase comprising the hydrophilic solvent from the reaction mixture, followed by reuse of the hydrophilic solvent in step a), and purification of the polymerization product by distillation.

All these examples describe a free radical polymerisation of 1,3-butadiene in a batch-process, where all reagents are loaded in the reactor vessel and afterwards, the mixture is heated to the desired reaction temperature. If adjustments in the molecular weight of the final polymer are required, the ratio of monomer to hydrogen peroxide will be adjusted whereas high amounts of hydrogen peroxide lead to higher OH-numbers and thus, lower molecular weight.

The processes described in the prior art are capable of improvement, particularly in those processes which employ oxygen-containing reagents, there is a need to reduce the risk of explosion by means of a suitable way of carrying out the reaction and purification of the diene monomer and use of minimum amounts of explosive material.

In the light of this background, it was an object of the invention to provide a process of preparing hydroxy-functionalized polydienes which satisfies relatively demanding safety requirements, especially in respect of risk of explosion.

A further object of the invention was to provide a process of preparing hydroxy-functionalized polydienes having a low viscosity and low dispersity.

Surprisingly, it has been found that these and further objects can be achieved by the subject matter of the present patent application and especially by the subject matter of the accompanying independent claims, with embodiments being specified in the dependent claims.

The present invention accordingly provides a process for preparing hydroxy-functionalized polydiene, preferably polybutadiene or polyisoprene, by reacting monomer diene with hydrogen peroxide in the presence of a hydrophilic organic solvent, wherein the total amount of monomer diene used is added to the reaction in at least two parts, wherein the second part of the monomer diene is added to the reaction at a temperature of the reaction mixture that is at least +5 K different from the temperature of the reaction mixture at the addition of the first part of the monomer diene.

The present invention further provides hydroxy-functionalized polybutadiene, having a dispersity index D below 2.7, a viscosity at 30° C. below 3200 mPa*s, an OH-number of from 50 to 90, a number average molecular weight Mn of from 1.6 to 2.5 kDa, and a weight number average molecular weight Mw of from 4.0 to 5.6 kDa, and comprising the monomer units derived from 1,3-butadiene in a specific ratio as given below.

The present invention is also directed to the use of the hydroxy-functionalized polybutadiene according to the invention for the production of polyurethane-based thermo- or electro-insulations, adhesives or sealants, or polyesters, preferably block-co-polyesters.

The process according to the invention has the advantage that the reaction has a lower exothermic reaction potential and can therefore be run in a much safer way. This due to the introduction of the diene raw material in several parts which keeps the exothermic reaction potential low and less explosive hydrogen peroxide needs to be employed.

Due to the introduction of the raw material in more than one part to the reaction, the reaction process and the resulting products can be regulated easily.

The process of the present invention has the further advantage, that hydroxy-functionalized polybutadienes can be produced, having a lower viscosity and lower dispersity compared to state of the art batch processes.

The hydroxy-functionalized polybutadienes according to the invention have very good wetting properties. Due to the good wetting properties, they can advantageous be used as adhesive or for the production formulation of adhesives, especially adhesives used for adhering or insulating very small parts.

The process, product and use according to the invention are described below by way of example, without any intention that the invention be limited to these illustrative embodiments. Where ranges, general formulae or classes of compounds are specified below, these are intended to encompass not only the corresponding ranges or groups of compounds which are explicitly mentioned but also all subranges and subgroups of compounds which can be obtained by removing individual values (ranges) or compounds. Where documents are cited in the context of the present description, their content shall fully form part of the disclosure content of the present invention, particularly in respect of the matters referred to. Where figures are given in percent hereinafter, these are percentages by weight unless stated otherwise. Where averages, for example molar mass averages, are specified hereinafter, these are the numerical average unless stated otherwise. Where properties of a material are referred to hereinafter, for example viscosities or the like, these are properties of the material at 25° C. unless stated otherwise. Where chemical (empirical) formulae are used in the present invention, the given indices may be either absolute numbers or average values. For polymeric compounds, the indices preferably represent average values.

The process according to the invention for preparing hydroxy-functionalized polydiene, preferably polybutadiene or polyisoprene, by reacting monomer diene with hydrogen peroxide in the presence of a hydrophilic organic solvent, is characterized in that the total amount of monomer diene used is added to the reaction in at least two (discrete) parts, wherein the second part of the monomer diene is added to the reaction at a temperature of the reaction mixture that is at least +5 K different from the temperature of the reaction mixture at the addition of the first part of the monomer diene.

Preferably the second part of the monomer diene is added to the reaction at least 30 minutes, preferably of from 30 to 90 minutes after the addition of the first part of the monomer diene.

It might be advantageous to add the second part of the monomer diene to the reaction at a temperature of the reaction mixture that is preferably at least +15 K different, more preferably +25 to +35 K different from the temperature of the reaction mixture at the addition of the first part of the monomer diene.

The first part of the monomer diene is preferably added to the reaction before the addition of hydrogen peroxide and the second part of the monomer diene is preferably added to the reaction after the addition of hydrogen peroxide.

It might be advantageous that the second part of the monomer diene is added to the reaction at least 30 minutes, preferably of from 30 to 90 minutes after the addition of the first part of the monomer diene, and that the second part of the monomer diene is added to the reaction at a temperature of the reaction mixture that is at least +5 K different, preferably +15 K, more preferably +25 to +35 K different from the temperature of the reaction mixture at the addition of the first part of the monomer diene, and that the first part of the monomer diene is preferably added to the reaction before the addition of hydrogen peroxide and the second part of the monomer diene is preferably added to the reaction after the addition of hydrogen peroxide.

The process according to the present invention preferably comprises the steps:

a) heating hydrophilic organic solvent to a temperature of from 75 to 105° C. at a pressure of from 0.0 to 5.0 MPa, preferably 1.2 to 3.0 MPa,
b) adding a first part of the total amount of diene before the start of, during, or after step a), preferably before the start of the heating in step a) resulting in a pressure of from 0.1 to 5.0 MPa, preferably 0.5 to 3.0 MPa, most preferably 0.75 to 2.0,
c) adding the hydrogen peroxide to the mixture,
d) heating the mixture obtained in step c) to a temperature of from 110 to 150° C., preferably of from 115 to 130° C.,
e) adding the second part of the total amount of the diene in step d) while heating or at the final temperature obtained in step d), and keeping the reaction mixture at a temperature equal to or maximal differing +/−10° C. from the temperature obtained in step d),
f) terminating the reaction.

Preferably the adding of the second part of the total amount of the monomer diene in step d) is completed before reaching the final temperature obtained in step d), the final temperature preferably being below 130° C.

Preferably the process of the invention is performed in a reactor. More preferably the process steps a) to e) are performed in a reactor. Preferably all steps a) to e) are performed in the same reactor. The reactor preferably being a stainless-steel reactor, more preferably a stainless-steel autoclave.

The hydrophilic organic solvent is preferably an alkanol which is liquid at room temperature. Preferably the hydrophilic organic solvent is an organic solvent which is miscible with water at 25° C. without formation of an organic phase separate from the aqueous phase occurring. In a preferred embodiment, the hydrophilic organic solvent is an unbranched or branched alkanol which is liquid at room temperature, more preferably an unbranched or branched 1-alkanol, most preferably isopropanol or ethanol. The proportion of the hydrophilic organic solvent, preferably ethanol, is from 15 to 50% by weight, preferably from 17.5 to 30% by weight, more preferably from 20 to 30% or from 22 to 30% by weight.

The total amount of the hydrophilic organic solvent used is preferably from 15 to 50% by weight, more preferably from 22 to 30% by weight, that of the diene is preferably from 50 to 80% by weight, that of water is preferably less than 15% by weight, more preferably from 2 to 8% by weight, and that of the hydrogen peroxide is preferably from 1 to 15%, preferably 1.5 to 7.5 by weight, each based on the total weight of the reaction mixture.

The hydrogen peroxide used is preferably an aqueous solution of hydrogen peroxide, more preferably an aqueous solution comprising of from 25% by weight to 99% by weight, preferably from 33.3% by weight to 75% by weight and most preferably 50% by weight of hydrogen peroxide based on the total weight of the aqueous hydrogen peroxide solution.

The temperature of the reaction mixture in step c) is preferably not less than 100° C.

The reaction time in step e) measured from addition of the second part of the diene is at least 0.5 hour, more preferably 1 to 3 hours, most preferably 1.5 to 2.5 hours.

The weight ratio of the first part diene added to the second part diene added is preferably of from 2 to 1 to 1 to 10, more preferably from 1 to 1 to 1 to 8, even more preferably from 1 to 3 to 1 to 5, and most preferably 1 to 4.

The weight ratio of the total amount of hydrogen peroxide used and the total amount of diene used is preferably of from 1 to 10 to 1 to 40, more preferably from 1 to 15 to 1 to 30 and most preferably from 1 to 16 to 1 to 23.

It might be advantageous, when the reaction is terminated in step f) by contacting the reaction mixture with water, preferably deionized water. Preferably the temperature of the water is from 20 to 80° C., more preferably from 30 to 70° C. and most preferably from 50 to 65° C.

It might be advantageous when the reaction mixture is contacted with water without prior cooling in step e).

Preferably the reaction mixture from step e) has a temperature at the beginning of step f) which is not more than 20° C. lower, preferably not more than 15° C. lower, more preferably not more than 10° C. lower, than that in step e).

It might be advantageous when process according to the invention comprises a further step g) of separating off unreacted gaseous diene from the reaction mixture obtained after step f), followed by condensation, distillation and reuse of the unreacted gaseous diene, and/or separation of the hydrophilic organic solvent from the reaction mixture obtained after step f), and optionally reuse of the hydrophilic organic solvent in step a), and optionally purification of the polymerization product by distillation. Suitable processes are described in Fluidverfahrenstechnik, edited by R. Goedecke, p. 637 ff, 2006 Wiley-VCH Verlag Gmbh & co KGaA, Weinheim.

The separating of the hydrophilic solvent from the polymerization product might preferably be done using a bottom valve or a decanter. The hydrophilic organic solvent can be recovered from the aqueous phase by distillation and be reused for the polymerization reaction in step a). Distillation processes are described in Fluidverfahrenstechnik, edited by R. Goedecke, p. 689 ff (Chapter 8 Rektifikation) 2006 Wiley-VCH Verlag Gmbh & co KGaA, Weinheim.

It might also be advantageous when at least part of the unreacted gaseous diene is separated off from the reaction mixture before step f), optionally followed by condensation, distillation and/or reuse of the unreacted gaseous diene. This might be done by releasing the pressure from the reaction vessel immediately before step f).

The removal of a gas by means of a flash apparatus is described in Fluidverfahrenstechnik, edited by R. Goedecke, p. 693, 2006 Wiley-VCH Verlag GmbH & Co KGaA, Weinheim.

The condensed diene obtained by separating off the unreacted gaseous diene by either method mentioned above is preferably contacted with an antioxidant, where the antioxidant is preferably selected from the group consisting of dithionite, pyrogallol, ascorbic acid and a mixture comprising bisulphite and sulphite. Preferably the antioxidant is used in a concentration of from 0.1 to 1.5% by weight, more preferably of from 0.2 to 1% by weight, based on the condensed diene. Most preferably the antioxidant is a mixture comprising bisulphite and sulphite, preferably iron bisulphite and iron sulphite in a final concentration of from 0.1 to 1.5% by weight, preferably from 0.2 to 1% by weight, based on the condensed diene.

The process according to the invention is preferably run in an apparatus for the polymerization of a diene which comprises a reaction vessel (1) for the polymerization of the diene, which is suitable for reaction of a diene with hydrogen peroxide in a hydrophilic organic solvent to form a reaction mixture, a flash apparatus (2) which is suitable for allowing the reaction mixture to be discharged from the reaction vessel (1) into it and is suitable for allowing unreacted, gaseous diene from the flash apparatus to be separated from the reaction mixture and transferred into an apparatus for condensation (5), subsequently into an apparatus for distillation (6) and finally back into the reaction vessel (1), and is suitable for enabling water to be initially placed therein and contacted with the reaction mixture from the reaction vessel (1) to form an aqueous phase comprising the hydrophilic organic solvent, also an apparatus for phase separation (3) located downstream of the flash apparatus, which is suitable for allowing the reaction mixture separated from the unreacted, gaseous diene in the flash apparatus (2) to be transferred into it and suitable for enabling the aqueous phase comprising the hydrophilic organic solvent to be separated from the reaction mixture and transferred firstly into an apparatus for distillation (7) and finally back into the reaction vessel (1), also an apparatus for distillation (4) located downstream of the apparatus for phase separation (3), which is suitable for enabling the reaction mixture separated from the aqueous phase comprising the hydrophilic organic solvent in the apparatus for phase separation (3) to be transferred into it and suitable for enabling the product from the reaction mixture separated from the aqueous phase comprising the hydrophilic organic solvent to be purified by distillation. The reaction vessel (1) is preferably a vessel made of passivated stainless steel. The apparatus is preferably equipped with suitable connecting pipes, connecting the reaction vessel (1), the flash apparatus (2), the apparatus for condensation (5), the apparatus for distillation (6), the apparatus for phase separation (3) and the apparatus for distillation (7).

The apparatus for condensation (5) preferably comprises an antioxidant which is preferably selected from the group consisting of dithionite, pyrogallol, ascorbic acid and a mixture comprising bisulphite and sulphite. The apparatus for phase separation (3) is preferably a decanter.

In a preferred apparatus used in the process according to the invention the reaction vessel (1) is suitable for enabling unreacted, gaseous diene to be transferred from the reaction vessel into an apparatus for condensation (5), subsequently into an apparatus for distillation (6) and finally back into the reaction vessel (1).

The process of the invention is especially useful for preparing hydroxy-functionalized polydiene, preferably hydroxy-functionalized polybutadiene or polyisoprene, more preferably hydroxy-functionalized polybutadiene and most preferably the hydroxy-functionalized polybutadiene according to the invention.

In the context of the present invention, the term "polybutadiene" is to be understood as meaning a product obtainable by polymerization of monomer units each having at least two conjugated double bonds, wherein, in order of increasing preference, at least 80, 85, 90, 95, 98, 99 or 99.9% of the monomer units, preferably exclusively, are 1,3-butadiene. Possible further compounds (impurities) may be, e.g. alkanes or alkenes having 3 to 5 carbon atoms, preferably propene, 1-butene or 1,2-butadiene.

The hydroxy-functionalized polybutadienes according to the invention are characterized in that they have a dispersity index D (Mw/Mn) of below 2.7, preferably of from 2.1 to 2.7, a viscosity at 30° C. below 3200 mPa*s, preferably of from 2100 to 3200 mPa*s, an OH-number of from 50 to 90, more preferably of from 70 to 90, a number average molecular weight Mn of from 1.6 to 2.5 kDa, preferably of from 1.6 to 2.0 kDa, and a weight number average molecular weight Mw of from 4.0 to 5.6 kDa, preferably of from 4.0 to 5.0 kDa, and comprise the monomer units derived from 1,3-butadiene (A)

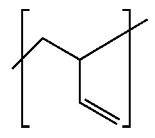

-continued (B)

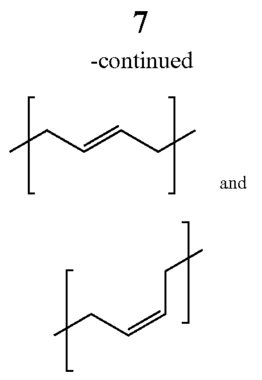

and (C)

wherein the proportion of (A) in the entirety of the 1,3-butadiene-derived monomer units present in the polybutadiene is from 10 to 60 mol %, and wherein the sum of the proportions of (B) and (C) in the entirety of the 1,3-butadiene-derived monomer units present in the polybutadiene is from 40 to 90 mol %.

Preferably the proportion of units of the formula (A) in the entirety of the monomer units derived from 1,3-butadiene present in the polybutadiene is 15 to 30 mole percent, the proportion of units of the formula (B) in the entirety of the monomer units derived from 1,3-butadiene present in the polybutadiene is 50 to 70 mole percent, and the proportion of units of the formula (C) in the entirety of the monomer units derived from 1,3-butadiene present in the polybutadiene is 15 to 30 mole percent, with the proviso that the entirety of all monomer units (A), (B) and (C) add up to 100 mole percent.

In the monomer units shown with the formulae (A), (B) and (C), where a square bracket in the formula representation chosen in this application shows the monomer units (A), (B) and (C) derived from 1,3-butadiene present in the polybutadiene, the bonds marked with the respective square bracket do not end with a methyl group, for instance; instead, the relevant monomer units are bonded via this bond to another monomer unit. The monomer units (A), (B) and (C) may be arranged in the polymer in any desired sequence in this case. A random arrangement is preferred.

The proportion of the monomer units in the polybutadiene according to the invention, which do not conform to any of the formulae (A), (B) or (C), is preferably less than 20 mole percent, preferably less than 5 mole percent, particularly preferably less than 1 mole percent and especially preferably less than 0.1 mole percent, based on the entirety of the monomer units. The proportion of the monomer units in the polybutadiene according to the invention, which do not conform to any of the formulae (A), (B) or (C), may be controlled in the production process by using 1,3-butadiene which accordingly comprises preferably less than 20 mole percent, preferably less than 5 mole percent, particularly preferably less than 1 mole percent and especially preferably less than 0.1 mole percent of impurities, particularly of dienes which are not 1,3-butadiene. The determination of the proportion of the monomer units in the polybutadiene can be done as described in the experimental section (test methods).

The hydroxy-terminated polybutadiene according to the invention has preferably an average functionality of from 0.1 to 4, more preferably 0.7 to 3, particularly preferably 1.2 to 2.8. This means that a polybutadiene molecule has on average preferably 0.1 to 4, more preferably 0.7 to 3 and particularly preferably 1.2 to 2.8 OH-groups irrespective of its length.

The hydroxy-functionalized polybutadiene according to the invention are preferably obtained by a process according to the invention.

The hydroxy-functionalized polybutadiene according to the invention are preferably used for the production of polyurethane-based thermo- or electro-isolation, adhesives or sealants or polyesters, preferably block-co-polyesters, The present invention will be further illustrated by the following nonlimiting examples which indicate further features, embodiments, aspects and advantages of the present invention.

EXAMPLES

Test Methods:

a) Determination of OH Number (OHN):

The concentration of the OH groups is determined in accordance with DIN 53240-2 by titrimetric means in mg KOH/g of polymer.

b) Determination of Viscosity:

The viscosity of the polymers produced was determined in accordance with DIN EN ISO 3219 in Pa·s using a rotational viscometer at the temperature specified in each case.

c) Determination of Molecular Weight and Dispersity:

The number-average and weight-average molecular weight (Mn and Mw, respectively) of the polymers used in the context of the present invention is determined according to DIN 55672-1 by means of gel permeation chromatography in tetrahydrofuran as eluent and polystyrene for calibration. Measurements were carried out at 40° C. in tetrahydrofuran (THF) at a concentration of 1 g/l and a flow rate of 0.3 ml/min. Chromatographic separation was achieved using a PSS SDV Micro 5μ/4.6×30 mm precolumn and a PSS SDV Micro linear S 5μ/4.6 ×250 mm (2×) separation column. Detection was by means of an RI detector. Calibration was carried out by means of polybutadiene standards (PSS-Kit polybutadiene-1,4, Mp 831-106000, Part No.: PSS-bdfkit, Mn: 1830/4330/9300/18000/33500). Dispersity D=Mw/Mn.

d) Determination of the Molar Proportions of the Monomer Units

The molar proportions of the monomer units according to the formulae (A), (B) and (C) are determined by IR spectroscopy relative to polybutadiene standards. For this purpose, the samples (ca. 80 to 250 mg) are dissolved in 10 ml of carbon disulfide ($CS_2$). In the case of high vinyl content low concentrations are used and at high cis content higher concentrations are used. The measurements are carried out in IR cuvettes with NaCl windows and 0.5 mm path length. The solvent is subtracted and the spectrum is shown as absorbance in the evaluation range 1100 to 600 $cm^{-1}$. At absorbances above 1, the measurement is repeated with a lower concentration. The absorbances above baselines of the following signals are determined:

trans-1,4-polybutadiene: 968 $cm^{-1}$ 1,2-polybutadiene: 911 $cm^{-1}$ cis-1,4-polybutadiene: 730 $cm^{-1}$ The molar proportions of the monomer components are given by % comp (i)=Ext(i)*100%/(E(i)*c*d*)

where

Ext(i)=absorbance above baseline

E(i)=extinction coefficient (substance specific, to be determined by calibration) [E]=L/(g*cm)

d=path length of the cuvette in cm c=concentration of the sample in g/L

Example 1: Comparative Example 520 ml of toluene-denatured ethanol (ethanol concentration 97% by weight) were firstly placed in a passivated 5 l stainless steel autoclave from Büchi (model 4; stainless steel: 1.4571; pressure rating: from −0.1 to 4.0 MPa) as reactor. Subsequently, 1086 g of 1,3-butadiene (m BD (a) in table 1) introduced into the reactor and the content of the reactor was heated. After the temperature had reached at least 90° C., 148 mL of hydrogen peroxide (aqueous solution, hydrogen peroxide concentration 50% by weight) were introduced via a lock. The content of the reactor was then heated further to 124° C. From the point in time at which the hydrogen peroxide was introduced, the reaction mixture was brought to 124° C. within 1 hour and then maintained for 1 hour at this temperature.

After the reaction time had elapsed, the content of the reactor was cooled to less than or equal to 100° C. During this cooling step, the pressure of the reactor was slowly reduced from 2.0-4.0 MPa to 0.3 MPa within 30 minutes. After a temperature of 100° C. and a pressure of 0.3 MPa had been reached, the content of the reactor was transferred into a vessel being charged with 650 g water having a temperature of 60° C. provided for this purpose (flash apparatus). To separate off excess of butadiene, the content of the flash vessel was stirred for one hour at 60° C. under a pressure which was from 0.02 to 0.04 MPa below atmospheric pressure in order to remove residual butadiene monomer. After a settling time of about one hour, two phases were obtained. The upper organic phase contained the desired polymer, while the lower aqueous phase contained the unreacted hydrogen peroxide.

The aqueous phase was separated from the organic phase via a bottom valve. The volatile organic constituents were removed from the organic phase using a rotary evaporator and reduced pressure, leaving 760 g of the desired product, which based on the amount of butadiene used corresponds to a yield of 70.0%. The raw material used are given in table 1. Some properties of the product obtained are given in table 2.

Example 2: According to the Invention, Butadiene Added in Two Parts 520 ml of toluene-denatured ethanol (ethanol concentration 97% by weight) were firstly placed in a passivated 5 l stainless steel autoclave from Büchi (model 4; stainless steel: 1.4571; pressure rating: from −1 to 40 bar). 537 g of 1,3-butadiene (m BD (a) in table 1) were subsequently introduced and the content of the reactor was heated. After the temperature had reached at least 90° C., 148 mL of hydrogen peroxide (aqueous solution, hydrogen peroxide concentration 50% by weight) were introduced via a lock. The content of the reactor was then heated further to 124° C. When the reaction temperature of 124° C. was reached another 537 g of 1,3-butadiene (m BD (b) in table 1) were introduced. From the point in time at which the hydrogen peroxide was introduced, the reaction mixture was brought to 124° C. within 1 hour and then maintained for 1 hour at this temperature.

After the reaction time had elapsed, the contents of the reactor were cooled to less than or equal to 100° C. During this cooling step, the pressure of the reactor was slowly reduced from 2.0-4.0 MPa to 0.3 MPa within 30 minutes. After a temperature of 100° C. and a pressure of 0.3 MPa had been reached, the content of the reactor was transferred into a vessel being charged with 650 g water having a temperature of 60° C. provided for this purpose (flash apparatus). To separate off excess of butadiene, the content of the flash vessel was stirred for one hour at 60° C. under a pressure which was from 0.02 to 0.04 MPa below atmospheric pressure in order to remove residual butadiene monomer. After a settling time of about one hour, two phases were obtained. The upper organic phase contained the desired polymer, while the lower aqueous phase contained the unreacted hydrogen peroxide.

The aqueous phase was separated from the organic phase via a bottom valve. The volatile organic constituents were removed from the organic phase using a rotary evaporator and reduced pressure, leaving 680 g of the desired product, which based on the amount of butadiene used corresponds to a yield of 62.4%. The raw material used are given in table 1. Some properties of the product obtained are given in table 2.

Example 3: According to the Invention, Butadiene Added in Two Parts 520 ml of toluene-denatured ethanol (ethanol concentration 97% by weight) were firstly placed in a passivated 5 l stainless steel autoclave from Büchi (model 4; stainless steel: 1.4571; pressure rating: from −1 to 40 bar). 537 g of 1,3-butadiene (m BD (a) in table 1) were subsequently introduced and the content of the reactor was heated. After the temperature had reached at least 90° C., 134 mL of hydrogen peroxide (aqueous solution, hydrogen peroxide concentration 50% by weight) were introduced via a lock. The content of the reactor was then heated further to 124° C. When the reaction temperature of 124° C. was reached another 537 g of 1,3-butadiene (m BD (b) in table 1) were introduced within 30 min. From the point in time at which the hydrogen peroxide was introduced, the reaction mixture was brought to 124° C. within 1 hour and then maintained at this temperature for 1 hour. The pressure in the reactor during the reaction varied in a range of from 1.4 to 2.8 MPa.

After the reaction time had elapsed, the contents of the reactor were cooled to less than or equal to 100° C. During this cooling step, the pressure of the reactor was slowly reduced from 2.0-4.0 MPa to 0.3 MPa within 30 minutes. After a temperature of 100° C. and a pressure of 0.3 MPa had been reached, the content of the reactor was transferred into a vessel being charged with 650 g water having a temperature of 60° C. provided for this purpose (flash apparatus). To separate off excess of butadiene, the content of the flash vessel was stirred for one hour at 60° C. under a pressure which was from 0.02 to 0.04 MPa below atmospheric pressure in order to remove residual butadiene monomer. After a settling time of about one hour, two phases were obtained. The upper organic phase contained the desired polymer, while the lower aqueous phase contained the unreacted hydrogen peroxide.

The aqueous phase was separated from the organic phase via a bottom valve. The volatile organic constituents were removed from the organic phase using a rotary evaporator and reduced pressure, leaving 656 g of the desired product, which based on the amount of butadiene used corresponds to a yield of 61.0%. The raw material used are given in table 1. Some properties of the product obtained are given in table 2.

Example 4: According to the Invention, Butadiene Dosage while Heating 520 ml of toluene-denatured ethanol (ethanol concentration 97% by weight) were firstly placed in a passivated 5 l stainless steel autoclave from Büchi (model 4; stainless steel: 1.4571; pressure rating: from −1 to 40 bar). 537 g of 1,3-butadiene (m BD (a) in table 1) were subsequently introduced and the content of the reactor was heated. After the temperature had reached at least 90° C., 134 mL of hydrogen peroxide (aqueous solution, hydrogen peroxide concentration 50% by weight) were introduced via a lock. The content of the reactor was then heated further to 124° C. and with beginning of the heating 537 g of 1,3-butadiene (m BD (b) in table 1) were introduced within 30 min. From the point in time at which the hydrogen peroxide was introduced, the reaction mixture was brought to 124° C. within 1 hour and then maintained at this temperature for 1 hour.

After the reaction time had elapsed, the contents of the reactor were cooled to less than or equal to 100° C. During this cooling step, the pressure of the reactor was slowly reduced from 2.0-4.0 MPa to 0.3 MPa within 30 minutes. After a temperature of 100° C. and a pressure of 0.3 MPa had been reached, the content of the reactor was transferred into a vessel being charged with 650 g water having a temperature of 60° C. provided for this purpose (flash apparatus). To separate off excess of butadiene, the content of the flash vessel was stirred for one hour at 60° C. under a pressure which was from 0.02 to 0.04 MPa below atmospheric pressure in order to remove residual butadiene monomer. After a settling time of about one hour, two phases were obtained. The upper organic phase contained the desired polymer, while the lower aqueous phase contained the unreacted hydrogen peroxide.

The aqueous phase was separated from the organic phase via a bottom valve. The volatile organic constituents were removed from the organic phase using a rotary evaporator and reduced pressure, leaving 741 g of the desired product, which based on the amount of butadiene used corresponds to a yield of 67.5%. The raw material used are given in table 1. Some properties of the product obtained are given in table 2.

Example 5: According to the Invention, Butadiene Dosage while Heating 520 ml of toluene-denatured ethanol (ethanol concentration 97% by weight) were firstly placed in a passivated 5 l stainless steel autoclave from Büchi (model 4; stainless steel: 1.4571; pressure rating: from −1 to 40 bar). 220 g of 1,3-butadiene (m BD (a) in table 1) were subsequently introduced and the content of the reactor was heated. After the temperature had reached at least 90° C., 134 mL of hydrogen peroxide (aqueous solution, hydrogen peroxide concentration 50% by weight) were introduced via a lock. The content of the reactor was then heated further to 124° C. and with beginning of the heating 880 g of 1,3-butadiene (m BD (b) in table 1) were introduced within 30 min. From the point in time at which the hydrogen peroxide was introduced, the reaction mixture was brought to 124° C. within 1 hour and then maintained at this temperature for 1 hour.

After the reaction time had elapsed, the contents of the reactor were cooled to less than or equal to 100° C. During this cooling step, the pressure of the reactor was slowly reduced from 2.0-4.0 MPa to 0.3 MPa within 30 minutes. After a temperature of 100° C. and a pressure of 0.3 MPa had been reached, the content of the reactor was transferred into a vessel being charged with 650 g water having a temperature of 60° C. provided for this purpose (flash apparatus). To separate off excess of butadiene, the content of the flash vessel was stirred for one hour at 60° C. under a pressure which was from 0.02 to 0.04 MPa below atmospheric pressure in order to remove residual butadiene monomer. After a settling time of up to one hour, two phases were obtained. The upper organic phase contained the desired polymer, while the lower aqueous phase contained the unreacted hydrogen peroxide.

The aqueous phase was separated from the organic phase via a bottom valve. The volatile organic constituents were removed from the organic phase using a rotary evaporator and reduced pressure, leaving 702 g of the desired product, which based on the amount of butadiene used corresponds to a yield of 64.1%. The raw material used are given in table 1. Some properties of the product obtained are given in table 2.

Example 6: According to the Invention, Butadiene Dosage while Heating 520 ml of toluene-denatured ethanol (ethanol concentration 97% by weight) were firstly placed in a passivated 5 l stainless steel autoclave from Büchi (model 4; stainless steel: 1.4571; pressure rating: from −1 to 40 bar). 220 g of 1,3-butadiene (m BD (a) in table 1) were subsequently introduced and the content of the reactor was heated. After the temperature had reached at least 90° C., 134 mL of hydrogen peroxide (aqueous solution, hydrogen peroxide concentration 50% by weight) were introduced via a lock. The content of the reactor was then heated further to 124° C. and with beginning of the heating 880 g of 1,3-butadiene (m BD (b) in table 1) were introduced within 60 min. From the point in time at which the hydrogen peroxide was introduced, the reaction mixture was brought to 124° C. within 1 hour and then maintained at this temperature for 1 hour.

After the reaction time had elapsed, the contents of the reactor were cooled to less than or equal to 100° C. During this cooling step, the pressure of the reactor was slowly reduced from 2.0-4.0 MPa to 0.3 MPa within 30 minutes. After a temperature of 100° C. and a pressure of 0.3 MPa had been reached, the content of the reactor was transferred into a vessel being charged with 650 g water having a temperature of 60° C. provided for this purpose (flash apparatus). To separate off excess of butadiene, the content of the flash vessel was stirred for one hour at 60° C. under a pressure which was from 0.02 to 0.04 MPa below atmospheric pressure in order to remove residual butadiene monomer. After a settling time of about one hour, two phases were obtained. The upper organic phase contained the desired polymer, while the lower aqueous phase contained the unreacted hydrogen peroxide.

The aqueous phase was separated from the organic phase via a bottom valve. The volatile organic constituents were removed from the organic phase using a rotary evaporator and reduced pressure, leaving 677 g of the desired product, which based on the amount of butadiene used corresponds to a yield of 62.0%. The raw material used are given in table 1. Some properties of the product obtained are given in table 2.

Example 7: According to the Invention, Butadiene Added in Two Parts 520 ml of toluene-denatured ethanol (97% by weight) were firstly placed in a passivated 5 l stainless steel autoclave from Büchi (model 4; stainless steel: 1.4571; pressure rating: from 1 to 40 bar). 537 g of 1,3-butadiene (m BD (a) in table 1) were subsequently introduced and the content of the reactor was heated. After the temperature had reached at least 90° C., 119 mL of hydrogen peroxide (50% by weight)

were introduced via a lock. The content of the reactor was then heated further to 124° C. When the reaction temperature of 124° C. was reached another 537 g of 1,3-butadiene (m BD (b) in table 1) were introduced within 30 min. From the point in time at which the hydrogen peroxide was introduced, the reaction mixture was brought to 124° C. within 1 hour and then maintained at this temperature for 1 hour. The pressure in the reactor during the reaction varied in a range of from 1.4 to 2.8 MPa.

After the reaction time had elapsed, the contents of the reactor were cooled to less than or equal to 100° C. During this cooling step, the pressure of the reactor was slowly reduced from 2.0-4.0 MPa to 0.3 MPa within 30 minutes. After a temperature of 100° C. and a pressure of 0.3 MPa had been reached, the content of the reactor was transferred into a vessel being charged with 650 g water having a temperature of 60° C. provided for this purpose (flash apparatus). To separate off excess of butadiene, the content of the flash vessel was stirred for one hour at 60° C. under a pressure which was from 0.02 to 0.04 MPa below atmospheric pressure in order to remove residual butadiene monomer. After a settling time of about one hour, two phases were obtained. The upper organic phase contained the desired polymer, while the lower aqueous phase contained the unreacted hydrogen peroxide.

The aqueous phase was separated from the organic phase via a bottom valve. The volatile organic constituents were removed from the organic phase using a rotary evaporator and reduced pressure, leaving 606 g of the desired product, which based on the amount of butadiene used corresponds to a yield of 55.7%. The raw material used are given in table 1. Some properties of the product obtained are given in table 2.

Example 8: according to the invention, butadiene added in two parts, shorter reaction time 520 ml of toluene-denatured ethanol (97% by weight) were firstly placed in a passivated 5 l stainless steel autoclave from Büchi (model 4; stainless steel: 1.4571; pressure rating: from 1 to 40 bar). 537 g of 1,3-butadiene (m BD (a) in table 1) were subsequently introduced and the content of the reactor was heated. After the temperature had reached at least 90° C., 119 mL of hydrogen peroxide (50% by weight) were 35 introduced via a lock. The content of the reactor was then heated further to 124° C. When the reaction temperature of 124° C. was reached another 537 g of 1,3-butadiene (m BD (b) in table 1) were introduced within 30 min. From the point in time at which the hydrogen peroxide was introduced, the reaction mixture was brought to 124° C. within 1 hour and then maintained at this temperature for 45 minutes. The pressure in the reactor during the reaction varied in a range of from 1.4 to 2.8 MPa.

After the reaction time had elapsed, the contents of the reactor were cooled to less than or equal to 100° C. During this cooling step, the pressure of the reactor was slowly reduced from 2.0-4.0 MPa to 0.3 MPa within 30 minutes. After a temperature of 100° C. and a pressure of 0.3 MPa had been reached, the content of the reactor was transferred into a vessel being charged with 650 g water having a temperature of 60° C. provided for this purpose (flash apparatus). To separate off excess of butadiene, the content of the flash vessel was stirred for one hour at 60° C. under a pressure which was from 0.02 to 0.04 MPa below atmospheric pressure in order to remove residual butadiene monomer. After a settling time of about one hour, two phases were obtained. The upper organic phase contained the desired polymer, while the lower aqueous phase contained the unreacted hydrogen peroxide.

The aqueous phase was separated from the organic phase via a bottom valve. The volatile organic constituents were removed from the organic phase using a rotary evaporator and reduced pressure, leaving 585 g of the desired product, which based on the amount of butadiene used corresponds to a yield of 53.8%. The raw material used are given in table 1. Some properties of the product obtained are given in table 2.

Example 9: according to the invention, butadiene added in two parts 520 ml of toluene-denatured ethanol (97% by weight) were firstly placed in a passivated 5 l stainless steel autoclave from Büchi (model 4; stainless steel: 1.4571; pressure rating: from 1 to 40 bar). 271 g of 1,3-butadiene (m BD (a) in table 1) were subsequently introduced and the content of the reactor was heated. After the temperature had reached at least 90° C., 105 mL of hydrogen peroxide (50% by weight) were introduced via a lock. The content of the reactor was then heated further to 124° C. When the reaction temperature of 124° C. was reached another 815 g of 1,3-butadiene (m BD (b) in table 1) were introduced within 30 min. From the point in time at which the hydrogen peroxide was introduced, the reaction mixture was brought to 124° C. within 1 hour and then maintained at this temperature for 1 hour. The pressure in the reactor during the reaction varied in a range of from 1.4 to 2.8 MPa.

After the reaction time had elapsed, the contents of the reactor were cooled to less than or equal to 100° C. During this cooling step, the pressure of the reactor was slowly reduced from 2.0-4.0 MPa to 0.3 MPa within 30 minutes. After a temperature of 100° C. and a pressure of 0.3 MPa had been reached, the content of the reactor was transferred into a vessel being charged with 650 g water having a temperature of 60° C. provided for this purpose (flash apparatus). To separate off excess of butadiene, the content of the flash vessel was stirred for one hour at 60° C. under a pressure which was from 0.02 to 0.04 MPa below atmospheric pressure in order to remove residual butadiene monomer. After a settling time of about one hour, two phases were obtained. The upper organic phase contained the desired polymer, while the lower aqueous phase contained the unreacted hydrogen peroxide.

The aqueous phase was separated from the organic phase via a bottom valve. The volatile organic constituents were removed from the organic phase using a rotary evaporator and reduced pressure, leaving 512 g of the desired product, which based on the amount of butadiene used corresponds to a yield of 47.1%. The raw material used are given in table 1. Some properties of the product obtained are given in table 2.

Example 10: Comparative Example 520 ml of toluene-denatured ethanol (ethanol concentration 97% by weight) were firstly placed in a passivated 5 l stainless steel autoclave from Büchi (model 4; stainless steel: 1.4571; pressure rating: from −0.1 to 4.0 MPa) as reactor. Subsequently, 1094 g of 1,3-butadiene (m BD (a) in table 1) introduced into the reactor and the content of the reactor was heated. After the temperature had reached at least 90° C., 104 mL of hydrogen peroxide (aqueous solution, hydrogen peroxide concentration 50% by weight) were introduced via a lock. The content of the reactor was then heated further to 124° C. From the point in time at which the hydrogen peroxide was introduced, the reaction mixture was brought to 124° C. within 1 hour and then maintained for 1 hour at this temperature.

After the reaction time had elapsed, the content of the reactor was cooled to less than or equal to 100° C. During this cooling step, the pressure of the reactor was slowly reduced from 2.0-4.0 MPa to 0.3 MPa within 30 minutes. After a temperature of 100° C. and a pressure of 0.3 MPa had been reached, the content of the reactor was transferred into a vessel being charged with 650 g water having a temperature of 60° C. provided for this purpose (flash apparatus). To separate off excess of butadiene, the content of the flash vessel was stirred for one hour at 60° C. under a pressure which was from 0.02 to 0.04 MPa below atmospheric pressure in order to remove residual butadiene monomer. After a settling time of about one hour, two phases were obtained. The upper organic phase contained the desired polymer, while the lower aqueous phase contained the unreacted hydrogen peroxide.

The aqueous phase was separated from the organic phase via a bottom valve. The volatile organic constituents were removed from the organic phase using a rotary evaporator and reduced pressure, leaving 435 g of the desired product, which based on the amount of butadiene used corresponds to a yield of 39.8%. The raw material used are given in table 1. Some properties of the product obtained are given in table 2.

Example 11: According to the Invention, Butadiene Added in Two Parts 520 ml of toluene-denatured ethanol (97% by weight) were firstly placed in a passivated 5 l stainless steel autoclave from Büchi (model 4; stainless steel: 1.4571; pressure rating: from 1 to 40 bar). 545 g of 1,3-butadiene (m BD (a) in table 1) were subsequently introduced and the content of the reactor was heated. After the temperature had reached at least 90° C., 65 mL of hydrogen peroxide (50% by weight) were introduced via a lock. The content of the reactor was then heated further to 124° C. When the reaction temperature of 124° C. was reached another 545 g of 1,3-butadiene (m BD (b) in table 1) were introduced within 30 min. From the point in time at which the hydrogen peroxide was introduced, the reaction mixture was brought to 124° C. within 1 hour and then maintained at this temperature for 1 hour. The pressure in the reactor during the reaction varied in a range of from 1.4 to 2.8 MPa.

After the reaction time had elapsed, the contents of the reactor were cooled to less than or equal to 100° C. During this cooling step, the pressure of the reactor was slowly reduced from 2.0-4.0 MPa to 0.3 MPa within 30 minutes. After a temperature of 100° C. and a pressure of 0.3 MPa had been reached, the content of the reactor was transferred into a vessel being charged with 650 g water having a temperature of 60° C. provided for this purpose (flash apparatus). To separate off excess of butadiene, the content of the flash vessel was stirred for one hour at 60° C. under a pressure which was from 0.02 to 0.04 MPa below atmospheric pressure in order to remove residual butadiene monomer. After a settling time of about one hour, two phases were obtained. The upper organic phase contained the desired polymer, while the lower aqueous phase contained the unreacted hydrogen peroxide.

The aqueous phase was separated from the organic phase via a bottom valve. The volatile organic constituents were removed from the organic phase using a rotary evaporator and reduced pressure, leaving 457 g of the desired product, which based on the amount of butadiene used corresponds to a yield of 41.9%. The raw material used are given in table 1. Some properties of the product obtained are given in table 2.

TABLE 1

Amount of raw material used and yield in examples 1 to 9.

| Example | V H2O2 | m BD (a) | m BD (b) | Yield |
|---|---|---|---|---|
| 1 | 148 mL | 1074 g | — | 70.0% |
| 2 | 148 mL | 537 g | 537 g | 62.4% |
| 3 | 134 mL | 537 g | 537 g | 61.0% |
| 4 | 134 mL | 537 g | 537 g | 67.5% |
| 5 | 134 mL | 220 g | 880 g | 64.1% |
| 6 | 134 mL | 220 g | 880 g | 62.0% |
| 7 | 119 mL | 537 g | 537 g | 55.7% |
| 8 | 119 mL | 537 g | 537 g | 53.8% |
| 9 | 105 mL | 271 g | 815 g | 47.1% |
| 10 | 104 mL | 1094 g | — | 39.8% |
| 11 | 65 mL | 545 g | 545 g | 41.9% |

TABLE 2

Properties of the products obtained in examples 1 to 9.

| Example | OHN | Viscosity (@30° C.) | Mn | Mw | D | Proportion of (A) |
|---|---|---|---|---|---|---|
| 1 | 79 | 3255 mPa · s | 1867 Da | 5291 Da | 2.8 | ~23 mol-% |
| 2 | 92 | 2882 mPa · s | 1643 Da | 4703 Da | 2.9 | ~23 mol-% |
| 3 | 88 | 3140 mPa · s | 1759 Da | 5134 Da | 2.9 | ~23 mol-% |
| 4 | 79 | 3372 mPa · s | 1938 Da | 5414 Da | 2.8 | ~23 mol-% |
| 5 | 80 | 2771 mPa · s | 1834 Da | 4829 Da | 2.6 | ~23 mol-% |
| 6 | 88 | 3100 mPa · s | 1751 Da | 4549 Da | 2.6 | ~23 mol-% |
| 7 | 82 | 2563 mPa · s | 1781 Da | 4536 Da | 2.6 | ~23 mol-% |
| 8 | 82 | 2317 mPa · s | 1739 Da | 4102 Da | 2.4 | ~23 mol-% |
| 9 | 79 | 2242 mPa · s | 1768 Da | 4052 Da | 2.3 | ~23 mol-% |
| 10 | 64 | 3892 mPa · s | 2358 Da | 6218 Da | 2.6 | ~23 mol-% |
| 11 | 55 | 2967 mPa · s | 2368 Da | 5061 Da | 2.1 | ~23 mol-% |

From the data of examples 1 and 2 given in tables 1 and 2 it becomes clear, that introducing the butadiene raw material in two parts, the second part being introduced when the reaction temperature is reached, results in a polybutadiene having a higher OH-number (OHN) and most often a lower molecular weight although the same amount of raw materials is used.

Performing the example 2 again using a lower amount of hydrogen peroxide (example 3) results in a polybutadiene with a higher OHN, a lower molecular weight and a lower viscosity compared to the polybutadiene obtained in example 1.

Performing example 3 again but adding the second half of the butadiene while heating the reaction mixture ramp (example 4) results in a polybutadiene with a similar OHN, a slightly higher molecular weight and a slightly higher viscosity compared the polybutadiene obtained in example 1.

Performing example 4 again but adding 80% of the butadiene used within 30 minutes while heating the reaction mixture ramp (example 5) results in a polybutadiene with a similar OHN, a lower molecular weight and a lower viscosity compared the polybutadiene obtained in example 1.

Performing example 5 again but adding 80% of the butadiene used within 60 minutes while heating the reaction mixture ramp (example 6) results in a polybutadiene with a higher OHN, a lower molecular weight and a lower viscosity compared the polybutadiene obtained in example 1. In Addition, examples 5 and 6 show a decrease in the dispersity.

From examples 7 to 9 it becomes clear that by performing the process according to the invention the amount of hydrogen peroxide needed can be reduced significantly. The examples also show, that polybutadienes can be produced having almost the same OHN than polybutadienes produced conventionally but showing a significantly reduced dispersity and viscosity.

The yield is slightly lower, but the process can be run in a safer mode. Since the unused raw material and the solvent can be recycled the lower yield can be accepted.

Comparing examples 10 and 11, it becomes clear that observed effects regarding a lower viscosity and more narrow dispersity can also be obtained with significant lower OH numbers. Having similar average molecular weight distributions, example 11 shows a significantly lower viscosity compared to comparative example 10, although the OHN is also significantly lower. In addition, the hydrogen peroxide employed for the synthesis is also significantly reduced and, surprisingly, the yield can be slightly improved compared to the process according to comparative example 10.

The invention claimed is:

1. A process for preparing hydroxy-functionalized polydiene comprising reacting monomer diene with hydrogen peroxide in the presence of a hydrophilic organic solvent, wherein the total amount of monomer diene used is added to a reaction in at least two parts, wherein a second part of the monomer diene is added to the reaction at a temperature of a reaction mixture that is at least +5 K different from the temperature of the reaction mixture at an addition of a first part of the monomer diene, wherein the process further comprises the steps:

a) heating hydrophilic organic solvent to a temperature of from 75 to 105° C., b) adding the first part of the total amount of monomer diene before, during, or after step a) resulting in a pressure of from 0.1 to 5.0 MPa, c) adding the hydrogen peroxide to the mixture, d) heating the mixture obtained in step c) to a temperature of from 110 to 150° C., e) adding the second part of the total amount of the monomer diene in step d) while heating or at the final temperature obtained in step d), and keeping the reaction mixture at a temperature equal to or maximal differing +/−10 K from the temperature obtained in step d), f) terminating the reaction.

2. The process according to claim 1, wherein the second part of the monomer diene is added to the reaction at least 30 minutes after addition of the first part of the monomer diene.

3. The process according to claim 1, wherein the first part of the monomer diene is added to the reaction before addition of hydrogen peroxide and the second part of the monomer diene is added to the reaction after addition of hydrogen peroxide.

4. The process according to claim 1, wherein adding of the second part of the total amount of the monomer diene in step d) is completed before reaching the final temperature obtained in step d).

5. The process according to claim 1, wherein the hydrophilic organic solvent is an alkanol which is liquid at room temperature.

6. The process according to claim 1, wherein the total amount of the hydrophilic organic solvent used is from 15 to 30% by weight, that of the monomer diene is from 60 to 80% by weight, that of water is less than 10% by weight, and that of the hydrogen peroxide is from 1 to 5% by weight, each based on the total weight of the reaction mixture.

7. The process according to claim 1, wherein the temperature of the reaction mixture in step c) is not less than 100° C.

8. The process according to claim 1, wherein a weight ratio of the first part of monomer diene added to the second part of monomer diene added is from 2 to 1 to 1 to 10.

9. The process according to claim 1, wherein a weight ratio of the total amount of hydrogen peroxide used and the total amount of monomer diene used is from 1 to 10 to 1 to 40.

10. The process according to claim 1, wherein the polydiene is polybutadiene or polyisoprene.

11. The process according to claim 1, wherein the pressure at step b) is from 0.5 to 3.0 MPa or from 0.75 to 2.0 MPa.

12. The process according to claim 1, wherein temperature at step d) is from 115 to 130° C.

13. The process according to claim 5, wherein alkanol is isopropanol or ethanol.

14. The process according to claim 6, wherein the total amount of the hydrophilic organic solvent used is from 22 to 30% by weight.

15. The process according to claim 6, wherein the total amount of water used is from 2 to 8.1% by weight.

16. The process according to claim 8, wherein the weight ratio of the first part of monomer diene added to the second part of monomer diene added is from 1 to 1 to 1 to 8.

17. The process according to claim 8, wherein the weight ratio of the first part of monomer diene added to the second part of monomer diene added is from 1 to 3 to 1 to 5.

18. The process according to claim 9, wherein the weight ratio of the total amount of hydrogen peroxide used and the total amount of monomer diene used is from 1 to 15 to 1 to 30 or from 1 to 16 to 1 to 23.

19. A hydroxy-functionalized polybutadiene, having a dispersity index D below 2.7, a viscosity at 30° C. below 3200 mPa*s, an OH-number of from 50 to 90, a number average molecular weight Mn of from 1.6 to 2.5 kDa, and a weight average molecular weight Mw of from 4.0 to 5.6 kDa, and comprising monomer units derived from 1,3-butadiene (A)

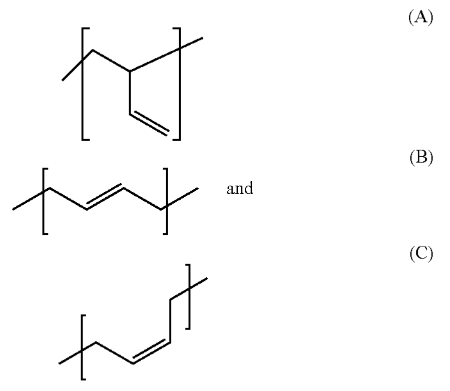

(B)

and (C)

wherein a proportion of (A) in the entirety of 1,3-butadiene-derived monomer units present in the polybutadiene is from 10 to 60 mol %, and wherein a sum of the proportions of (B) and (C) in the entirety of the 1,3-butadiene-derived monomer units present in the polybutadiene is from 40 to 90 mol %.

20. An electro-insulation, adhesive, sealant or polyester comprising the hydroxy-functionalized polybutadiene according to claim 19.

* * * * *